United States Patent [19]

Isomura

[11] Patent Number: 5,060,101
[45] Date of Patent: Oct. 22, 1991

[54] STORAGE DEVICE HAVING A LOCK SYSTEM FOR THE ACCESS MECHANISM AND METHOD FOR LOCKING

[75] Inventor: Akihiro Isomura, Tokyo, Japan

[73] Assignee: Kabushiki Kaisha Toshiba, Kawasaki, Japan

[21] Appl. No.: 472,185

[22] Filed: Jan. 30, 1990

[30] Foreign Application Priority Data

Jan. 31, 1989 [JP] Japan .................. 1-21062

[51] Int. Cl.$^5$ .................. G11B 5/55; G11B 5/54; G11B 17/04
[52] U.S. Cl. .................. 360/106; 360/105; 360/99.06
[58] Field of Search .................. 360/105, 106, 99.06

[56] References Cited

U.S. PATENT DOCUMENTS

| | | | |
|---|---|---|---|
| 3,973,273 | 8/1976 | Lissner et al. | 360/98.07 |
| 4,188,648 | 2/1980 | Guerini | 360/105 |
| 4,716,480 | 12/1987 | Wiens et al. | 360/105 |
| 4,725,907 | 2/1988 | Jue | 360/105 |
| 4,796,130 | 1/1989 | Shimanuki | 360/105 |
| 4,807,072 | 2/1989 | Ono et al. | 360/105 |
| 4,816,942 | 3/1989 | Tanishima et al. | 360/105 |
| 4,851,943 | 7/1989 | Perry | 360/105 |
| 4,864,437 | 9/1989 | Couse et al. | 360/105 |
| 4,870,518 | 9/1989 | Thompson et al. | 360/99.12 |
| 4,899,328 | 2/1990 | Ishii et al. | 360/109 |

FOREIGN PATENT DOCUMENTS 58-161176  9/1983  Japan .
8304130   5/1982  PCT Int'l Appl. .

Primary Examiner—John H. Wolff
Assistant Examiner—Craig A. Renner
Attorney, Agent, or Firm—Cushman, Darby & Cushman

[57] ABSTRACT

A disk drive device comprises a base member, a disk drive motor mounted on the base member to drive date storage medium, a carriage means mounting at least a head for reading data stored on the medium and movable steplessly between first and second positions and a linear actuator for moving the carriage means to a predetermined position between the first and second positions. The carriage means can be kept immovable when the linear actuator is left inoperative.

20 Claims, 5 Drawing Sheets

STORAGE DEVICE HAVING A LOCK SYSTEM FOR THE ACCESS MECHANISM AND METHOD FOR LOCKING

BACKGROUND OF THE INVENTION

1. Field of the Invention

The present invention relates to a storage device having a lock system for the access mechanism on which heads are mounted, and a method for locking the access mechanism. More particularly, the invention relates to a storage device capable of locking the access mechanism linearly driven above different tracks on a recording medium, and a method of locking this access mechanism.

2. Description of the Related Art

There has been developed the filing device adapted to use a recording medium or floppy disk of 3.5 inches, for example, having extremely high density tracks. In the case where data is recorded on and reproduced from this recording medium, it is needed that the recording and reproducing means such as the magnetic head is moved with extremely high accuracy and at high speed and is correctly positioned relative to a destination track on the disk. To meet this need, there has been developed a filing device in which the carriage mounting the head is moved not by the step motor but by the linear actuator, because the linear actuator can more correctly position the head relative to a destination position. An example of this linear actuator for moving the head is disclosed in U.S. Pat. No. 4,745,503 which has been issued to the assignee of the present invention.

The U.S. Patent discloses a voice coil motor, which serves as the linear actuator, including a permanent magnet having an E-shaped yoke whose center portion is extended in the access direction of the head relative to the disk, a motor coil attached onto the center portion of the yoke and movable in the access direction of the head, and a flattened box-like carriage in which the motor coil is housed and fixed and on which the recording and reproducing head is mounted.

This voice coil motor is generally shaped flat because its carriage is made like a flat box. This enables the disk drive device to be made flat and applied to various fields.

Further, other linear actuators intended to be used for the disk drive device are disclosed in International Patent Application (Disclosure No. WO/83/04130) and preliminarily-opened Japanese Patent Application Sho 58-161176. Both of these are intended to provide a small-sized and high quality linear actuator and they are satisfactory to some extent.

In the case of the above-mentioned voice coil motors which serve as the actuator, however, the motor coil for moving the carriage is not excited when the head is not moved o head-mounted carriage is not in operation. The carriage is thus allowed to freely move in the direction of its gaining access to the floppy disk. This free movement of the carriage is preferable to work at high speed while the filing device is in operation.

When the device is not in operation, however, the free movement of the carriage must be prevented. In the case where the device is carried to another place, at the time when the device is not in operation, the carriage moves, together with the device, to strike against its stoppers, so that the head or head-mounted carriage can be broken at worst. Particularly in the case of the portable electronic machine using such device, the free movement of the carriage must be prevented because this machine is usually under carriage.

SUMMARY OF THE INVENTION

The present invention is therefore intended to eliminate the above-mentioned drawbacks.

An object of the present invention is to provide a disk drive device provided with a system for locking the carriage by an extremely simple means, while the electronic machine into which the disk drive device has been incorporated is left unused, without hindering the behavior of the linear actuator, and also to provide a method of locking the carriage.

According to an aspect of the present invention, this object can be achieved by a device for at least reproducing information recorded on an information recording medium comprising a base member, device means mounted on the base member for driving the recording medium, access means having a head for at least reading the information recorded on the recording medium, capable of moving continuously and smoothly between a first position and a second position, and also capable of staying at a third position between the first and second positions, and lock means for locking the access means at the third position as long as the access means is kept inoperative.

According to this device, the access means can be locked when the recording medium is ejected from the device and this device is left inoperative. Even when the device or electronic machine into which the device has been incorporated is carried to another place, the access means cannot move. This prevents the access means from being damaged while carrying the machine.

According to another aspect of the present invention, there can be provided an access device for at least a read head suitable for the disk drive device which includes a disk drive motor and an ejector system capable of chucking a disk-like recording medium on the disk drive motor and ejecting it from the disk drive device.

The access device comprises a support member having the read head and movable between a first position remote from a spindle motor means and a second position near to the spindle motor, a linear voice coil motor having a motor coil fixed to the support member and a permanent magnet fixed to the body of the disk drive device to move the head, and a swinging member having a first end pivoted on the body of the disk drive device and a second end engageable with the support member and swung between first and second positions by the ejector system. The swinging member can be held at its first position to hold the support member at the first position of the support member when the disk is ejected from the ejector system.

The head mounted on the support member can be fixed together with the support member by extremely simple members. This enables the disk drive device to be produced with safety and made compact.

According to a further aspect of the present invention, there can be provided an access device locking method suitable for a disk drive device which includes a disk drive motor, an ejector system capable of chucking a disk-like recording medium on the disk drive motor and ejecting it from the disk drive device, and an access device, provided with at least a read head and moved between first and second positions by a linear voice coil motor. The method of locking the access device comprises forming a plate-like member, which is made by elastic material, on the body of the disk drive device, projecting a protrusion from a support member for the storage system, which has the read head, to engage with an end of the plate-like member, and pivoting the other end of the plate-like member on the body of the disk drive device. A protrusion is projected from the center of the plate-like member between both ends thereof to engage with the ejector system so as to lock the support member at one of first and second positions when ejector system is moved to eject the disk from the disk drive device.

According to the method, the head can be surely and tightly locked by the elastic plate-like member, associating with the movement of the ejector system.

These and other objects as well as merits of the present invention will become apparent from the following detailed description with reference to the accompanying drawings.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
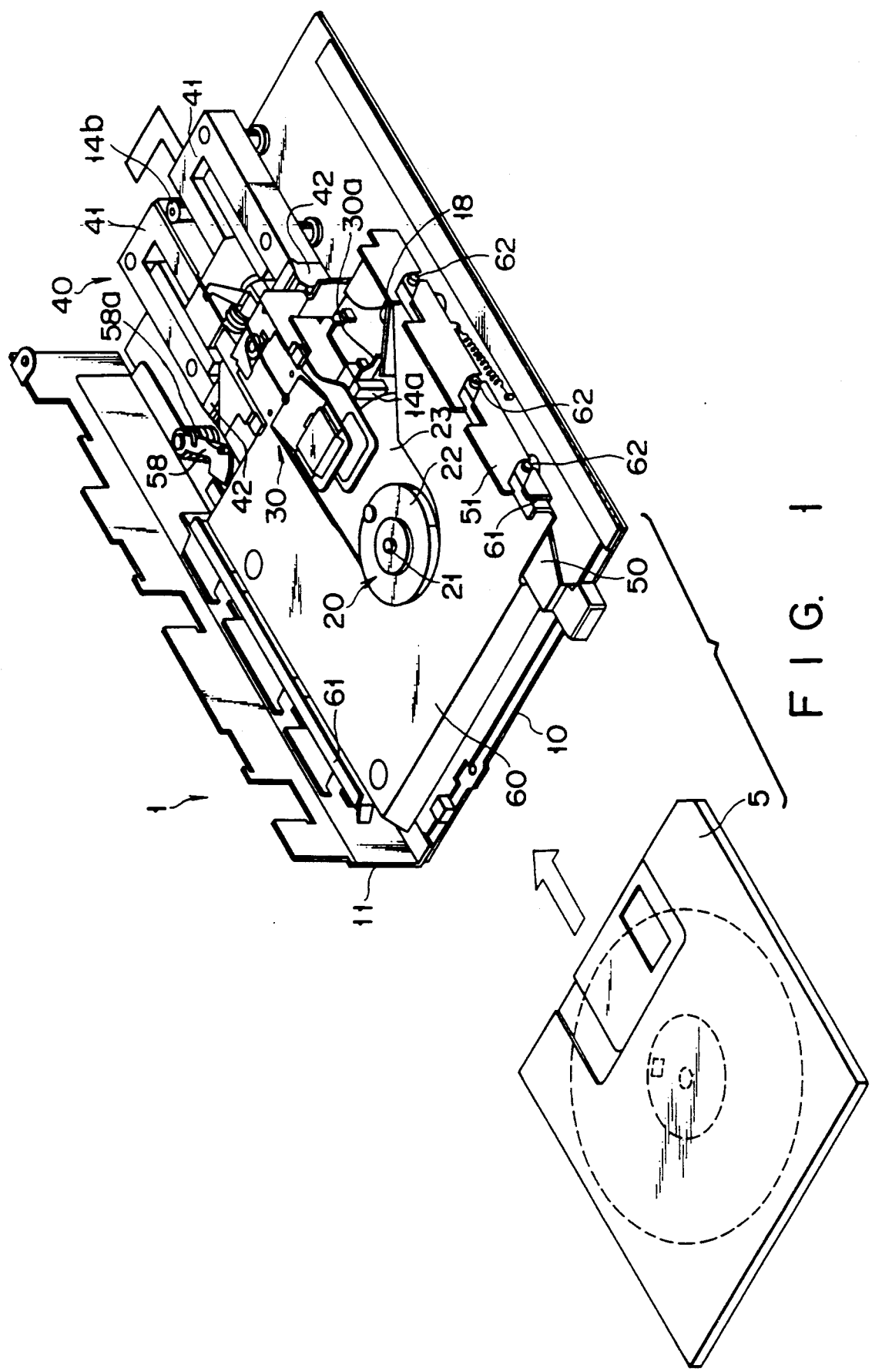
FIG. 1 is a perspective view cross-sectionally showing a part of a first example of the disk drive device provided with a rockable carriage system according to the present invention.

FIG. 1 shows a filing device or floppy disk drive device 1 according to one embodiment of the present invention. This disk drive device 1 is intended to record information on a common 3.5 inch floppy disk housed in a hard case 5 made of plastic, for example, and reproduce information from it. Needless to say, however, disk drive device 1 can also be applied to recording media such as the removable hard disks and optical disks.

Figure 2:
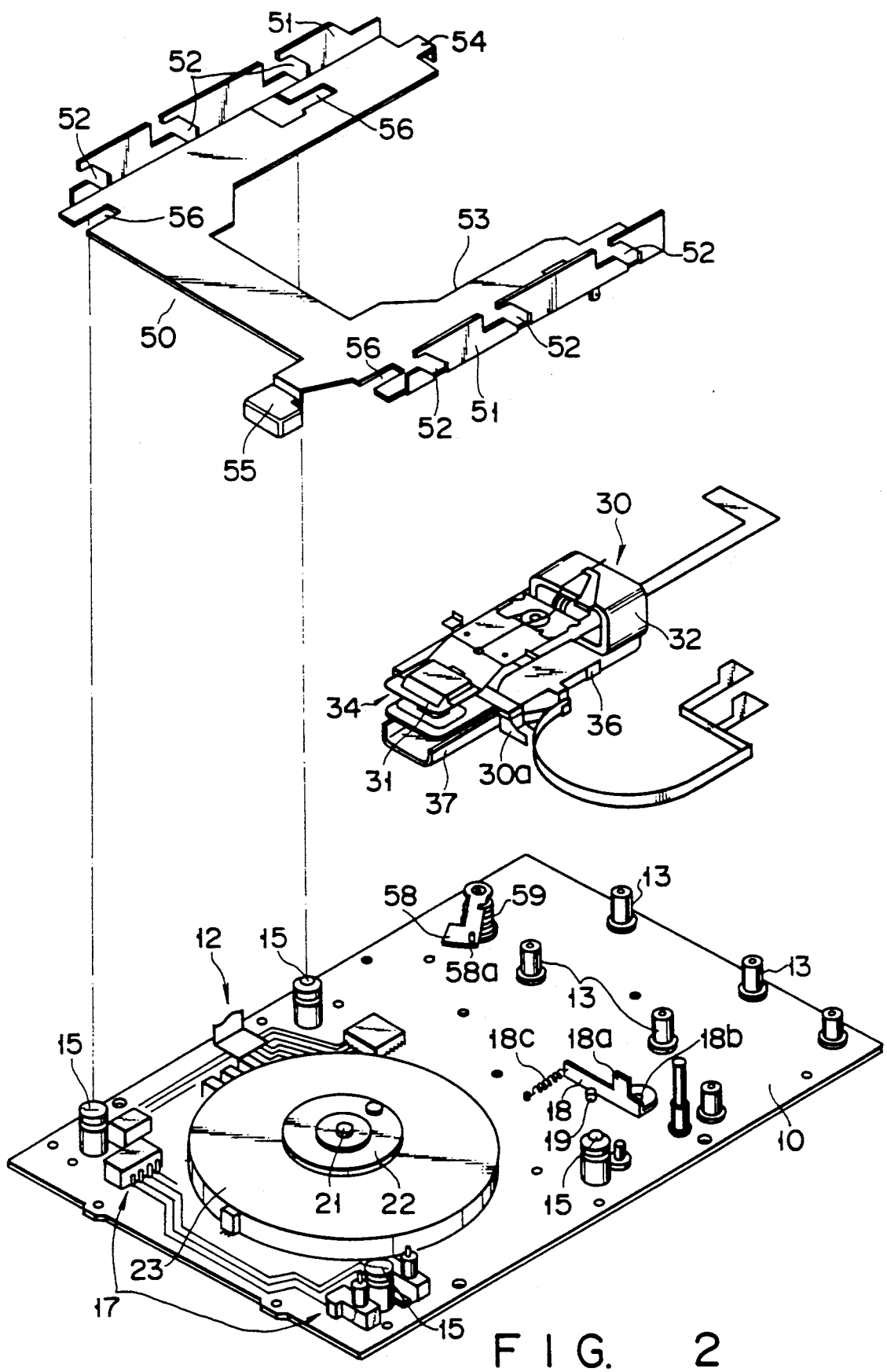
FIG. 2 is a perspective view showing main components of the disk drive device dismantled.

As shown in FIGS. 1 and 2, disk drive device 1 includes base frame 10 having side frames 11 erected on both sides thereof, spindle motor 20 mounted on base frame 10 to rotate the disk in the case or cartridge, carriage means 30 movable to gain access in the radial direction of disk within case or cartridge 5 and magnetic circuit means 40 for driving carriage means 30 to gain access to the disk. Carriage means 30 and magnetic circuit means 40 construct an access mechanism. Base frame 10 is a metal plate made by magnetic material and coated on the surface thereof with an insulation film of plastics. Side frame 11 is made of aluminum, plastics or iron and its lower edge portion is fixed to the side edge portion of base frame 10.

As clearly shown in FIG. 2, spindle motor 20 includes spindle shaft 21 electrically insulated from and freely rotatably mounted on base frame 10, chucking section 22 fixed to spindle shaft 21 to chuck the disk, and rotor 23 for rotating spindle shaft 21. Spindle motor 20 is common and it is controlled by a motor control means arranged on base frame 10. A part of the motor control means is represented by reference numeral 12 in FIG. 2.

Carriage means 30 of the access mechanism includes head section 34 having lower head 31 for READ/WRITE operation on SO side of the disk and upper head 31 for READ/WRITE operation SI side of the disk, and motor coil 32 which is a part of the common linear voice coil motor. The head section 34 and motor coil 32 are mounted as a unit on support 36. This support 36 is provided with guide 37 for guiding carriage means 30 relative to the disk. It is preferable that carriage means 30 is positioned through proper jigs by positioning pins 13, which are fixed to base frame 10, to accurately position its head section 34 relative to motor spindle shaft 21. A part of the read/write circuit for recording and reproducing information on and from the disk through the heads is represented by reference numeral 17 in FIG. 2.

Magnetic circuit means 40 for moving carriage means 30 includes a pair of U-shaped yokes 41 and 41 arranged side by side as seen in the case of the common linear voice coil motor, and a pair of I-shaped yokes 42 and 42 located on the open sides of U-shaped yokes 41 and 41, as shown in FIG. 1. These yokes are fixed onto base frame 10 by fixing pins 13. Motor coil 32 of carriage means 30 is attached to those arms of U-shaped yokes which are adjacent to each other. Carriage means 30 is driven by electromagnetic action created by coil 32 and magnetic circuit means 40. Detailed description on the behavior of this linear voice coil motor will be omitted because it is well known.

Base frame 10 further includes stoppers 14a and 14b for defining the moving range of carriage means 30, as shown in FIG. 1.

An ejector system is located around spindle motor 20 and it includes ejector plate 50 for chucking the disk on chucking section 22 of spindle motor 20 and ejecting the disk from the disk drive device, and receiver for holding cartridge 5, as shown in FIG. 1.

As shown in FIG. 2, ejector plate 50 has a pair of side walls 51 erected along both side rims thereof, center opening 53 in which chucking section 22 of spindle motor 20 is positioned, ejecting button 55 located behind in the direction of inserting disk 5 into the disk drive device, and projection 54 located before in this direction. Ejector plate 50 is urged by springs in a direction to eject the disk (see FIG. 1). Ejector plate 50 further has four guide slits 56 into which four support pins 15 fixed onto base frame 10 are inserted. Ejector plate 50 can be moved in the longitudinal direction of the disk drive device and parallel to base frame 10, keeping support pins 15 inserted into guide slits 56. When ejector plate 50 is located adjacent to carriage means 30, its projection 54 is hooked by latch 58 which is attached to base frame 10 and urged by spring 59. Latch 58 has pin 58a which releases projection 54 from latch 58 when the cartridge is inserted.

Both side walls 51 of ejector plate 50 are provided with a plurality of guide grooves 52 for guiding receiver 60. Guide pins 62 projecting outward from each of reverse L-shaped side walls 61 of receiver 60 are located in guide grooves 52. When disk cartridge 5 is inserted onto receiver 60 and pushed toward carriage means 30, projection 54 is released from latch 58. Receiver 60 is guided downward to spindle motor 20 by guide pins 62 moving in guide grooves 52. The disk in cartridge 5 inserted onto receiver 60 can be thus chucked on chucking section 22. When ejector plate 50 is pushed in the reverse direction by ejecting button 55, receiver 60 is guided upward by guide pins moving in guide grooves 52.

The ejector system for chucking the disk on the spindle motor of the disk drive device and ejecting it from the device may be designed to have another appropriate construction. The ejector system of this type is disclosed in U.S. Pat. No. 4,700,247 which is assigned to the assignee of the present invention.

Disk drive device 1 further has a locking means for locking carriage means 30 when disk cartridge 5 is ejected from the device, that is, ejector plate 50 is located adjacent to carriage means 30, after the disk is released from chucking section 22.

This carriage locking means includes elongated plate-like engaging member 18 pivoted on pin 18b on base frame 10, and protrusion 30a projected from support 36 of carriage means 30 and engaged with engaging member 18. Engaging member 18 may be made by any appropriate material such as metal and plastics having elasticity. Ear 18a is projected upward from engaging member 18 and engaged with that side rim of ejector plate 50 which is located on the side of carriage means 30. When ejector plate 50 is moved toward carriage means 30, ear 18a of engaging member 18 causes engaging member 18 to be swung clockwise round pin 18b (see FIGS. 1 and 2). Carriage means 30, pressed against carriage stopper, 14b, is thus kept immovable. The anticlockwise swinging of engaging member 18 is prevented by stopper 19 fixed onto base frame 10, when ejector plate 50 is moved reversely relative to carriage means 30.

Protrusion 30a of carriage means 30 which is engaged with engaging member 18 may be formed at any position if it can stop the movement of head section 34.

Referring to FIGS. 3 through 8, it will be described how ejector plate 50 and receiver 60 behave.

Figure 3:
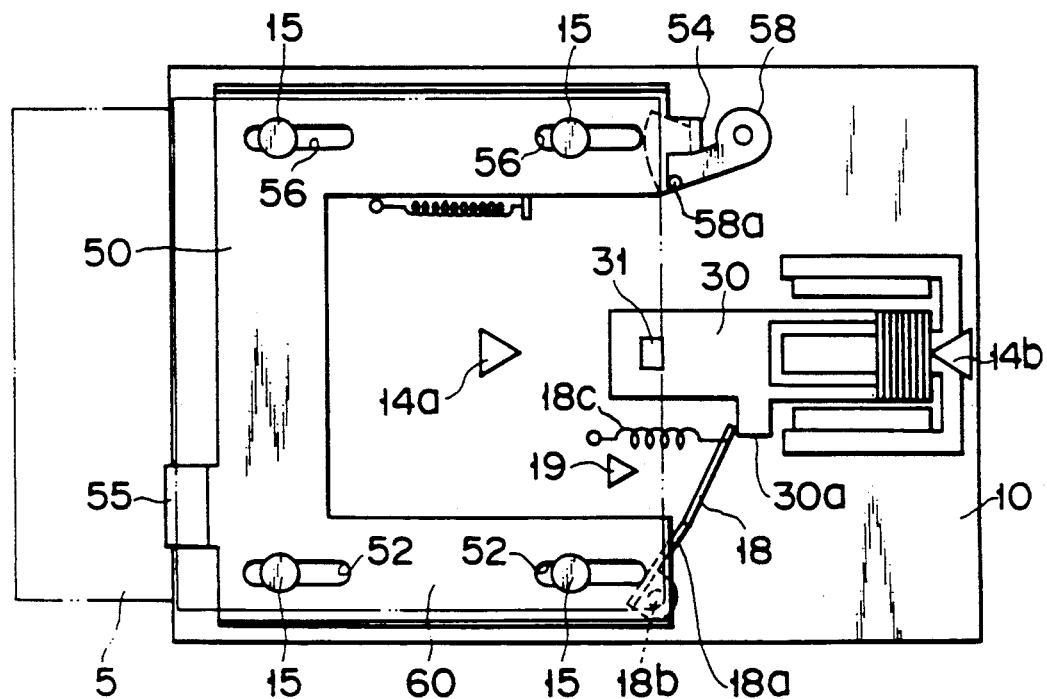
FIG. 3 is a plan showing the carriage and an ejector with a floppy disk not set in the disk drive device yet.
Figure 4:
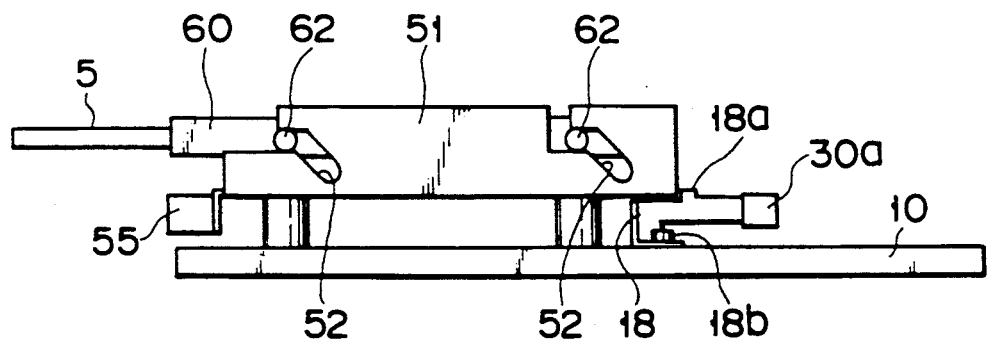
FIG. 4 is a side view showing how a disk receiver is arranged relative to the ejector.

As shown in FIGS. 3 and 4, ejector plate 50 is positioned adjacent to carriage means 30 and held there against the springs by latch 58 which hooks protrusion 54 of ejector plate 50, when cartridge 5 is ejected from the disk drive device. Receiver 60 is guided upward by guide pins 62 which move in guide grooves 52 of ejector plate 50. Further, carriage means 30 is kept immovable, being stopped in one direction by stopper 14b while in the other direction by engaging member 18 which is engaged with protrusion 30a of carriage means 30. Even when the electronic machine into which disk drive device 1 has been incorporated is carried or moved under the above state, therefore, carriage means 30 can be kept immovable, thereby preventing its heads 31 from being damaged.

Engaging member 18 has elasticity and it is thus sufficiently pressed against protrusion 30a of carriage means 30 through its ear 18a by ejector plate 50, thereby enabling carriage means 30 to be tightly held.

Figure 5:
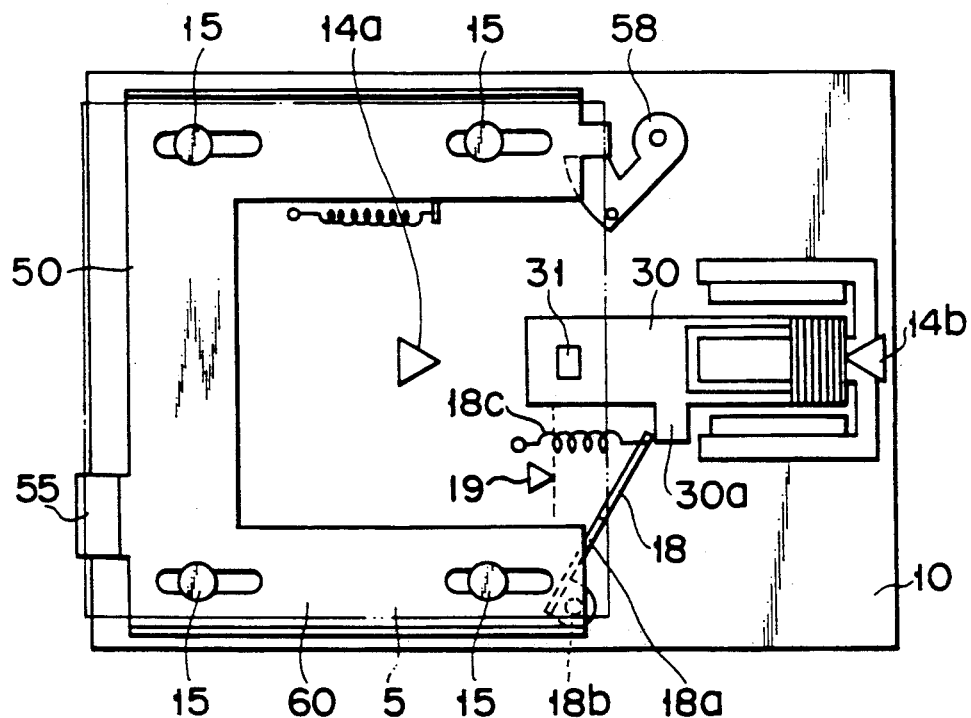
FIG. 5 is a plan, similar to FIG. 3, showing the disk drive device from which the floppy disk is to be removed.
Figure 6:
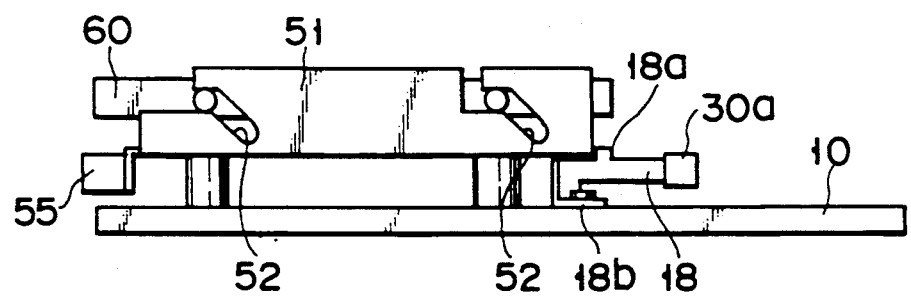
FIG. 6 is a side view, similar to FIG. 4, showing the disk drive device kept as shown in FIG. 5.

When cartridge 5 is inserted onto receiver 60 and pushed toward carriage means 30, ear 58a of latch 58 is swung anti-clockwise by cartridge 5 to release latch 58 from projection 54 of ejector plate 50, as shown in FIGS. 5 and 6. Ejector plate 50 is moved by the springs in the direction of its departing from carriage means 30. Receiver 60 is thus moved downward by guide pins 62 moving in guide grooves 52 of ejector plate 50 to chuck disk 5 on spindle motor 20.

Figure 7:
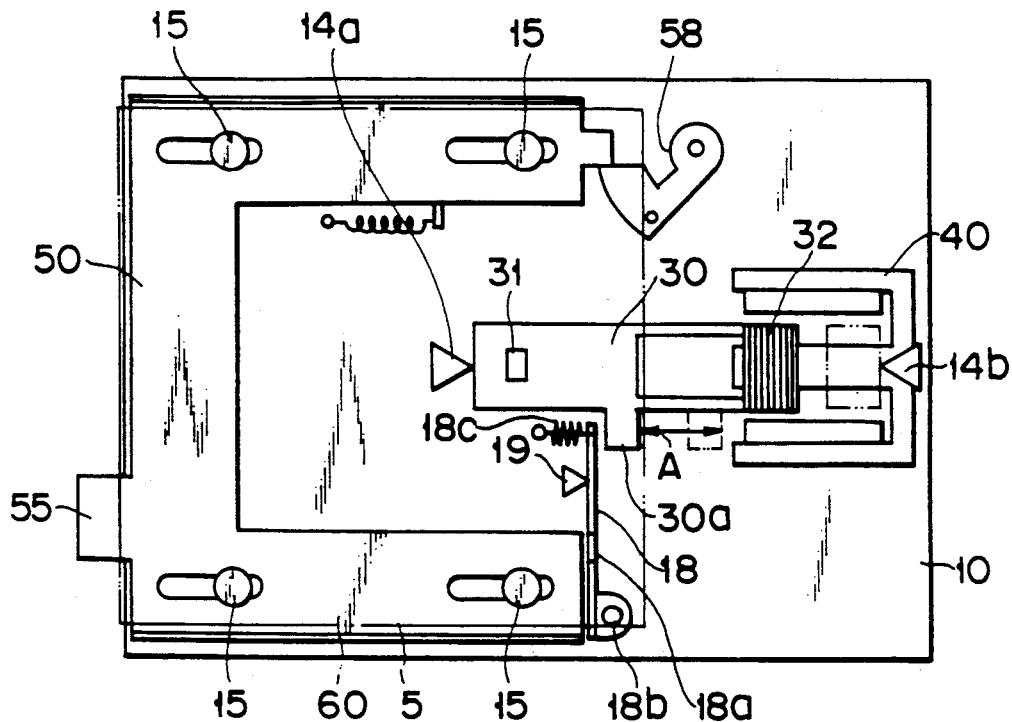
FIG. 7 is a view, similar to FIG. 3, showing the disk drive device from which the floppy disk has been removed.
Figure 8:
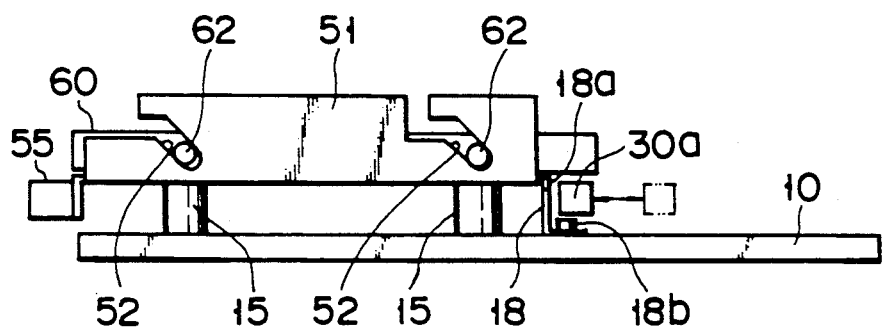
FIG. 8 is a side view, similar to FIG. 4, showing the disk drive device kept as shown in FIG. 7.

FIGS. 7 and 8 show how receiver 60, ejector plate 50 and carriage means 30 are located relative to one another when disk 5 is chucked on spindle motor 20. Ear 18a of engaging member 18 is released from ejector plate 50 under this state. Engaging member 18 is returned by spring 18c (see FIG. 2) to the position where member 18 is abutted against stopper 19. Therefore, carriage means 30 can be accurately and quickly moved to its predetermined position by the linear voice coil motor which consists of the coil and the magnetic circuit. Arrow A shows the direction and range of the movement of carriage means 30.

Although one preferred embodiment of the present invention has been described above, it should be understood that the present invention is not limited to this embodiment and that various modifications and changes can be made without departing from the spirit and scope of the present invention claimed in the appended claims.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A device for at least reproducing information recorded on an information recording medium, comprising:

a base member;

drive means mounted on said base member for driving said recording medium;

loading means for loading said recording medium on said drive means and for releasing said recording medium from said drive means, said loading means having a receiver member to receive said recording medium therein and an ejector member which is operated by an operator and guides said receiver member between an engaging position where said recording medium is engaged with said drive means and an ejection position where said recording medium is released from said drive means and can be ejected from and inserted into said device;

access means having a carriage means including a head for at least reading the information recorded on said recording medium, said carriage means being continuously and smoothly movable over a range of motion in which said head has access to said recording medium when said recording medium is engaged with said drive means; and locking means for mechanically locking said carriage means, including a locking member mechanically cooperative with said ejector member to hold said carriage means in a fixed position when said ejector member guides said receiver member into said ejection position, and to release said carriage means from said fixed position when said ejector member guides said receiver member into said engaging portion;

wherein said ejector member mechanically moves said locking member so that said locking member mechanically moves said carriage means into said fixed position when said ejector member guides said receiver member into said ejection position.

2. The device according to claim 1, wherein said access means comprises an electric actuator for moving said carriage means over said range of motion.

3. The device according to claim 2, wherein said actuator comprises a linear voice coil motor, whose motor coil is attached to said carriage means.

4. The device according to claim 3, wherein said ejector member is movable parallel to said base member between an out-position where said receiver member is brought into said engaging position and an in-position where said receiver member is brought into said ejection position, and wherein said loading means comprises a spring means for urging said ejector member toward said out-position and a latch member for holding said ejector member at said in-position, said latch member releasing said ejector member when said recording medium is inserted into said receiver member.

5. The device according to claim 4, wherein said locking member has two ends with one end pivoted on said base member and the other end engaged with said carriage means to hold it in said fixed position when said ejector member is placed in said in-position.

6. The device according to claim 5, wherein said locking member includes a protrusion located in a central portion thereof and pushed to said ejector member when said ejector member is moved to said in-position.

7. The device according to claim 6, wherein said locking member comprises an elongated plate made from resilient material.

8. The device according to claim 7, wherein said locking means includes a spring urging said locking member towards said ejector member.

9. The device according to claim 8, wherein said locking member is made from a material from the group consisting of metal and plastic.

10. The device according to claim 9, wherein said locking means includes a protrusion projecting from said carriage means and pushed by said other end of said locking member.

11. The device according to claim 11, wherein said locking means includes a stopper to hold said locking member against a biasing force of said spring when said ejector member is released into said out-position.

12. An access device suitable for a disk drive device which includes a disk drive motor, a receiver member for receiving a recording disk therein, and an ejector member having a loading position to cause said receiver member to load said recording disk on said disk drive motor and an ejection position to cause said receiver member to release said recording disk from said drive motor, said access device comprising:

a support member having at least a read head and being movable between a first position away from said drive motor and a second position close to said drive motor;

a linear voice coil motor having a motor coil fixed to said support member and a permanent magnet fixed to a base of said disk drive device to move said support member; and a locking member having two ends with one end pivoted on said base of said disk drive device and the other end engageable with said support member; and said locking member being mechanically moved by said ejector member to mechanically hold said support member in said first position when said ejector member is in said ejection position, said locking member being released by said ejector member to release said support member when said ejector member is in said loading position.

13. The access device according to claim 12, wherein said locking member has a protrusion projecting from a central portion thereof and engaged with said ejector member.

14. The access device according to claim 13, wherein said locking member comprises an elongated plate made from resilient material.

15. The access device according to claim 14, further comprising a spring for urging said locking member against said ejector member.

16. The access device according to claim 15, wherein said locking member is made from a material selected from the group consisting of metal and plastic.

17. The access device according to claim 16, wherein said support member has a protrusion engageable with a free end of said locking member.

18. The access device according to claim 17, further comprising a stopper to hold said locking member against a biasing force of said spring when said ejector member is in said ejection position.

19. The access device according to claim 18, wherein said support member includes write/read heads.

20. A method for locking an access device in a disk drive device which includes a disk drive motor, a loading means capable of chucking a disk on said disk drive motor and ejecting it from said disk drive device, and an access means provided with at least a read head movable between first and second positions by a linear voice coil motor, said method comprising the steps of:

providing a plate-like member having two ends on a body of said disk drive device, said plate-like member being made from resilient material;

engaging a protrusion from a support member for the access means with one end of said plate-like member;

pivoting the other end of said plate-like member on said body of said disk drive device; and mechanically moving a protrusion from a center portion of said plate-like member with said loading means so as to lock said support member at one of said first and second positions when said loading means is moved to eject said disk from said disk drive device, and to release said support member when said loading means is moved so that said disk is chucked on said disk drive motor.

* * * * *